(12) United States Patent
Shinagawa et al.

(10) Patent No.: US 8,725,389 B2
(45) Date of Patent: May 13, 2014

(54) CONTROL DEVICE FOR MULTI-CYLINDER INTERNAL COMBUSTION ENGINE

(75) Inventors: Tomohiro Shinagawa, Shizuoka-ken (JP); Yuuichi Katou, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 153 days.

(21) Appl. No.: 13/409,908

(22) Filed: Mar. 1, 2012

(65) Prior Publication Data

US 2012/0226430 A1 Sep. 6, 2012

(30) Foreign Application Priority Data

Mar. 3, 2011 (JP) ................................ 2011-046476

(51) Int. Cl.
*F02D 41/14* (2006.01)
*F02D 41/22* (2006.01)

(52) U.S. Cl.
USPC ........... 701/104; 701/107; 701/108; 701/109; 123/673; 123/690; 123/698

(58) Field of Classification Search
USPC ........... 701/104, 107–109; 123/673, 690, 698
See application file for complete search history.

(56) References Cited

U.S. PATENT DOCUMENTS

| | | | | |
|---|---|---|---|---|
| 5,623,913 A | * | 4/1997 | Kitajima et al. | ............... 123/673 |
| 7,024,302 B2 | | 4/2006 | Mizuno et al. | |
| 7,603,994 B2 | * | 10/2009 | Ueda | .............................. 123/673 |
| 2004/0003804 A1 | * | 1/2004 | Yasui | .............................. 123/673 |
| 2009/0139213 A1 | | 6/2009 | Mukai | |
| 2009/0171550 A1 | | 7/2009 | Teraya | |

FOREIGN PATENT DOCUMENTS

| | | |
|---|---|---|
| JP | 10-077883 A | 3/1998 |
| JP | 2000054895 A | 2/2000 |
| JP | 2005-133714 A | 5/2005 |
| JP | 2009-133260 A | 6/2009 |
| JP | 2009156216 A | 7/2009 |
| JP | 2010-101211 A | 5/2010 |

* cited by examiner

*Primary Examiner* — Erick Solis
(74) *Attorney, Agent, or Firm* — Gifford, Krass, Sprinkle, Anderson & Citkowski, P.C.

(57) ABSTRACT

A control device for a multi-cylinder internal combustion engine executes feedback control such that an air-fuel ratio detected by an air-fuel ratio detecting unit becomes a target air-fuel ratio, carries out external EGR, and, when an abnormal deviation that an air-fuel ratio of at least any one of cylinders deviates from the target air-fuel ratio has occurred during the feedback control, detects the abnormal deviation and an abnormal cylinder. When the abnormal deviation has been detected during feedback control and external EGR, the control device corrects the target air-fuel ratio to compensate for a detection error of the air-fuel ratio detecting unit due to the influence of specific components of exhaust gas. The control device changes the correction mode on the basis of whether the abnormal cylinder causes more intensive gas flow or equal or less intensive gas flow against the air-fuel ratio detecting unit than the other cylinders.

6 Claims, 9 Drawing Sheets

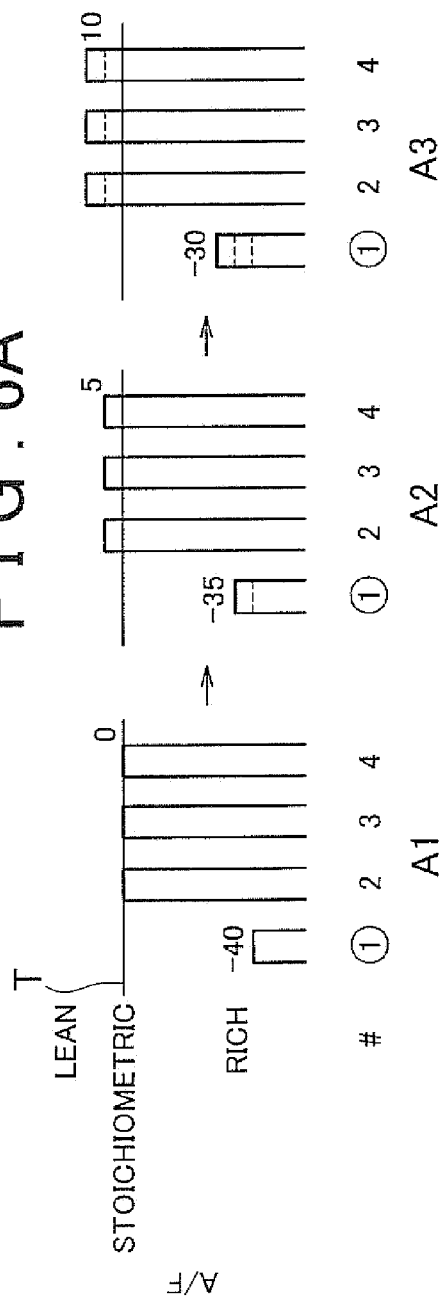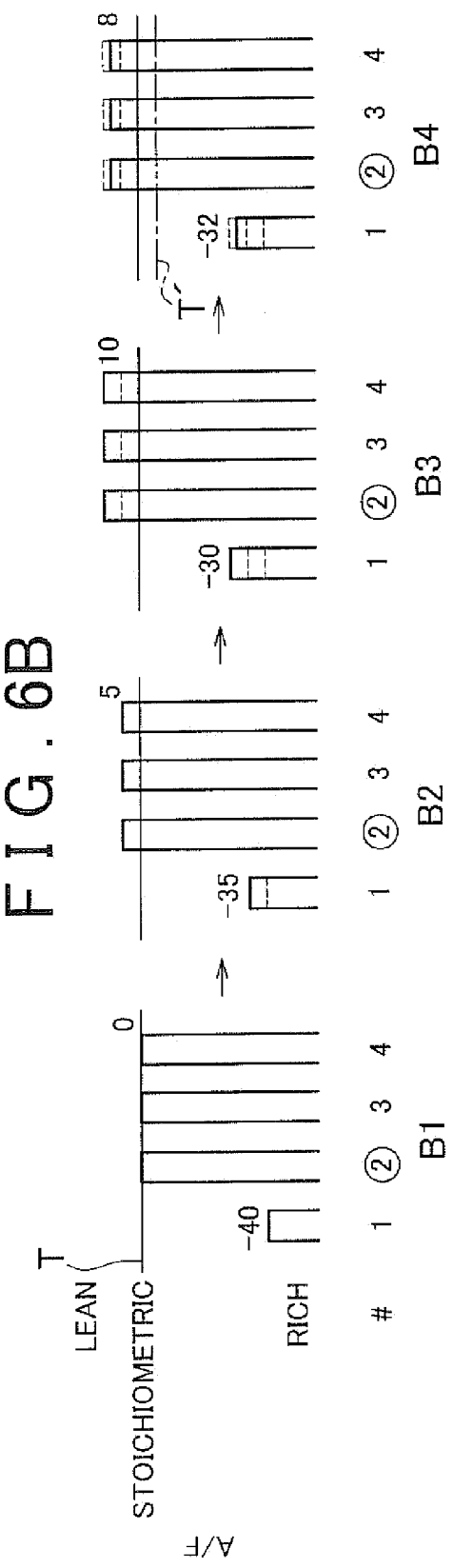

CONTROL DEVICE FOR MULTI-CYLINDER INTERNAL COMBUSTION ENGINE

CROSS REFERENCE TO RELATED APPLICATIONS

This application claims priority to Japanese Patent Application No. 2011-046476 filed on Mar. 3, 2011, which is incorporated herein by reference in its entirety including the specification, drawing and abstract.

BACKGROUND OF THE INVENTION

1. Field of the Invention

The invention relates to a control device for a multi-cylinder internal combustion engine and, more particularly, to a control device for a multi-cylinder internal combustion engine, which is able to carry out external EGR by which exhaust gas in an exhaust passage is circulated to an intake passage.

2. Description of Related Art

There is known a technique that is able to suppress the amount of generated NOx by carrying out external EGR to decrease the combustion speed and the combustion temperature. In addition, for example, there is also known a technique that, in an internal combustion engine equipped with a catalyst, in order to purify toxic substances in exhaust gas by the catalyst with high efficiency, air-fuel ratio feedback control that brings the air-fuel ratio of air-fuel mixture and, by extension, the air-fuel ratio of exhaust gas, close to a predetermined target air-fuel ratio.

Incidentally, in a multi-cylinder internal combustion engine, for example, the fuel injection systems of part of the cylinders fail and, as a result, the air-fuel ratios may significantly vary among the cylinders. Such a significant air-fuel ratio variation remarkably deteriorates exhaust gas emissions, so such a variation is desirably detected as an abnormality.

When an abnormal air-fuel ratio variation occurs while air-fuel ratio feedback control is being executed and external EGR is being carried out, cylinders that contain an air-fuel mixture having an air-fuel ratio richer than a target air-fuel ratio (rich cylinders) and cylinders that contain an air-fuel mixture having an air-fuel ratio leaner than the target air-fuel ratio (lean cylinders) are mixed. Then combustion deteriorates in the lean cylinders in combination with external EGR, so relatively large amounts of unburned components, such as H2, CO and HC, are emitted.

On the other hand, air-fuel ratio feedback control is configured to adjust the air-fuel ratio detected by an air-fuel ratio sensor to a target air-fuel ratio. The air-fuel ratio detected by the air-fuel ratio sensor tends to deviate from a true value because of the influence of the above unburned components (particularly, hydrogen H2), and it is conceivable to carry out correction for compensating for the deviation, that is, an error.

However, the intensity of gas that flows (gas flow intensity) against the air-fuel ratio sensor is different among the cylinders. Therefore, when correction is carried out uniformly without taking the difference into consideration, the correction may be inappropriate.

SUMMARY OF THE INVENTION

The invention provides a control device for a multi-cylinder internal combustion engine, which is able to carry out appropriate correction when an abnormal air-fuel ratio variation occurs while air-fuel ratio feedback control is being executed and external EGR is being carried out.

An aspect of the invention provides a control device for a multi-cylinder internal combustion engine. The control device includes: an air-fuel ratio detecting unit that is provided in an exhaust passage of the multi-cylinder internal combustion engine; an air-fuel ratio control unit that is configured to execute air-fuel ratio feedback control such that an air-fuel ratio of exhaust gas, detected by the air-fuel ratio detecting unit, becomes a predetermined target air-fuel ratio; an EGR device that is configured to carry out external EGR by which exhaust gas in the exhaust passage is circulated to an intake passage of the multi-cylinder internal combustion engine; an abnormality detecting unit that is configured to, when an abnormal deviation that an air-fuel ratio of at least any one of cylinders deviates from the target air-fuel ratio while the air-fuel ratio control unit is executing the air-fuel ratio feedback control has occurred detect the abnormal deviation and an abnormal cylinder that is the at least any one of the cylinders; and a deviation correction unit that is configured to, when the abnormal deviation has been detected While the air-fuel ratio control unit is executing the air-fuel ratio feedback control and the EGR device is carrying out the external EGR, correct the target air-fuel ratio in order to compensate for a detection error of the air-fuel ratio detecting unit due to an influence of specific components of exhaust gas and that is configured to change a mode of correction on the basis of whether the detected abnormal cylinder causes more intensive gas flow against the air-fuel ratio detecting unit than the other cylinders or causes equal or less intensive gas flow against the air-fuel ratio detecting unit than the other cylinders.

In addition, in the control device, the deviation correction unit may be configured to correct the target air-heel ratio when the abnormal cylinder causes more intensive gas flow than the other cylinders and not to correct the target air-fuel ratio when the abnormal cylinder causes equal or less intensive gas flow than the other cylinders.

In addition, in the control device, the abnormality detecting unit may be configured to detect an abnormal lean deviation that the air-fuel ratio of the abnormal cylinder deviates from the target air-fuel ratio toward a lean side and an abnormal rich deviation that the air-fuel ratio of the abnormal cylinder deviates from the target air-fuel ratio toward a rich side as distinguished from each Other, when the abnormal lean deviation has been detected, the deviation correction unit may be configured to correct the target air-fuel ratio when the abnormal cylinder causes more intensive gas flow than the other cylinders and not to correct the target air-fuel ratio when the abnormal cylinder cause equal or less intensive gas flow than the other cylinders; whereas; when the abnormal rich deviation has been detected, the deviation correction unit may be configured not to correct the target air-fuel ratio when the abnormal cylinder causes more intensive gas flow than the other cylinders and to correct the target air-fuel ratio when the abnormal cylinder causes equal or less intensive gas flow than the other cylinders.

In addition, in the control device, the deviation correction unit may be configured to correct the target air-fuel ratio using a first correction amount when the abnormal cylinder causes more intensive gas flow than the other cylinders and to correct the target air-fuel ratio using a second correction amount smaller than the first correction amount when the abnormal cylinder causes equal or less intensive gas flow than the other cylinders.

When the deviation correction unit corrects the target air-fuel ratio, the deviation correction unit may be configured to correct the target air-fuel ratio toward a rich side.

In addition, in the control device, the abnormality detecting unit may be configured to detect an air-fuel ratio deviation amount of the abnormal cylinder at the time when the abnormal deviation is occurring, and, when the deviation correction unit corrects the target air-fuel ratio, the deviation correction unit may be configured to change a correction amount on the basis of the detected air-fuel ratio deviation amount.

In addition, the control device may further include an abnormal-time correction unit that is configured to, when the abnormal deviation has been detected by the abnormality detecting unit, correct a fuel injection amount in order to bring a total air-fuel ratio of all the cylinders close to a stoichiometric air-fuel ratio.

In addition, the control device may further include an EGR rate calculation unit that is configured to calculate an EGR rate of the external EGR; and an EGR correction unit that is configured to correct the target air-fuel ratio on the basis of the calculated EGR rate.

In addition, the control device may further include a flow rate detecting unit that is configured to detect an exhaust gas flow rate; and a flow rate correction unit that is configured to correct the target air-fuel ratio on the basis of the detected exhaust gas flow rate.

With the above described control device for a multi-cylinder internal combustion engine, it is advantageously possible to carry out appropriate correction when an abnormal air-fuel ratio variation has occurred while air-fuel ratio feedback control is being executed and external EGR is being carried out.

BRIEF DESCRIPTION OF THE DRAWINGS

Features, advantages, and technical and industrial significance of exemplary embodiments of the invention will be described below With reference to the accompanying drawings, in which like numerals denote like elements, and wherein:

FIG. 6A is a view that shows a correction method when an abnormal rich deviation has occurred in the case where an abnormal cylinder causes more intensive gas flow than the other cylinders in the embodiment;

FIG. 6B is a view that shows a correction method when an abnormal rich deviation has occurred in the case where an abnormal cylinder causes equal or less intensive gas flow than the other cylinders in the embodiment;

DETAILED DESCRIPTION OF EMBODIMENTS

Figure 1:
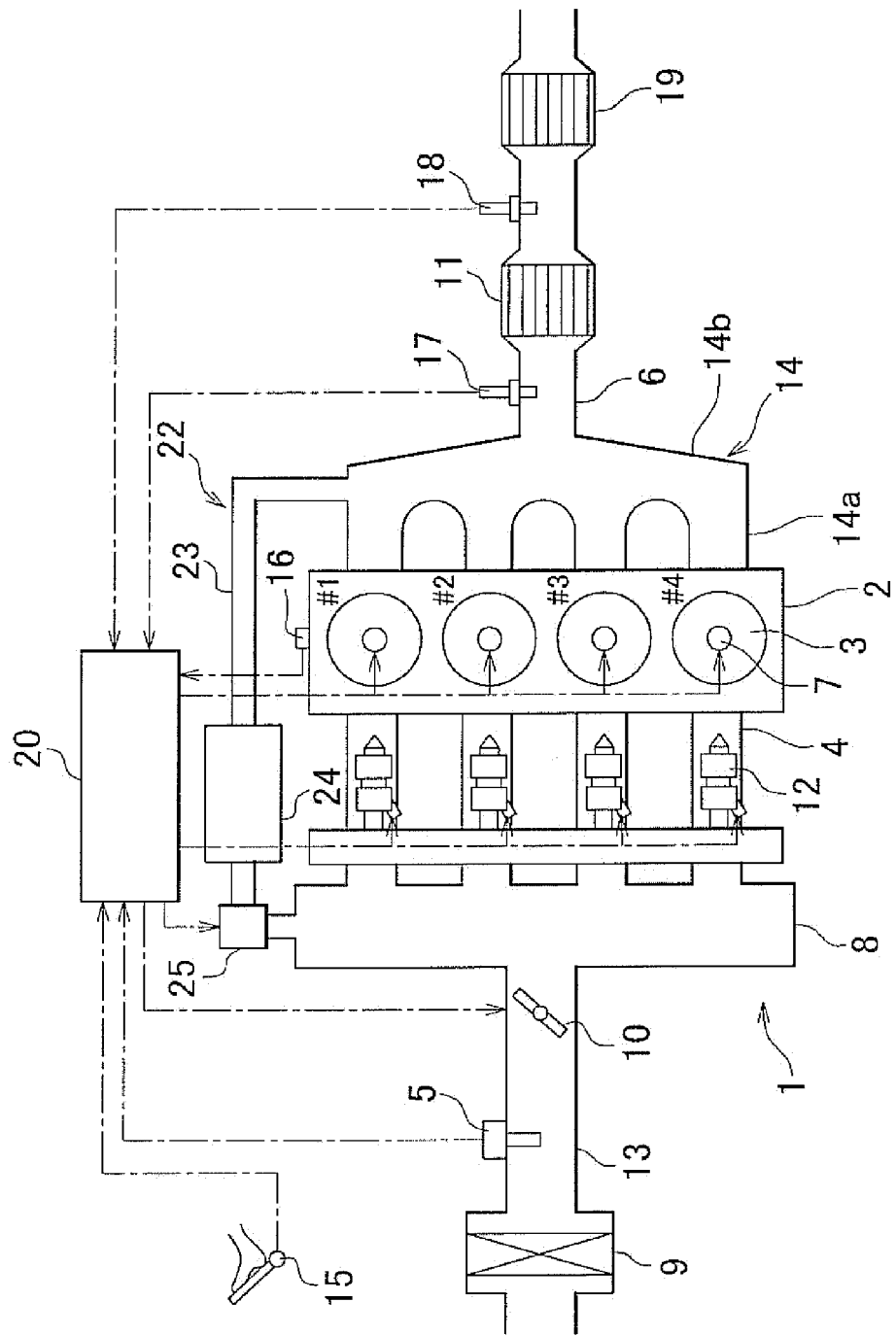
FIG. 1 is a schematic view of an internal combustion engine according to an embodiment of the invention.

Hereinafter, an embodiment of the invention will be described with reference to the accompanying drawings. FIG. 1 is a schematic view of an internal combustion engine according to the present embodiment. As shown in the drawing, the internal combustion engine (engine) 1 burns a mixture of fuel and air inside combustion chambers 3 formed in a cylinder block 2 to reciprocate corresponding pistons in the respective combustion chambers 3 to thereby generate power. The internal combustion engine 1 according to the present embodiment is a multi-cylinder internal combustion engine mounted on an automobile, and is, more specifically, an in-line four-cylinder spark-ignition internal combustion engine. The internal combustion engine 1 includes cylinders #1 to #4. However, the number of cylinders, type, and the like, of the internal combustion engine 1 are not specifically limited.

Although not shown in the drawing, intake valves that open or close corresponding intake ports and exhaust valves that open or close corresponding exhaust ports are provided for the cylinder head of the internal combustion engine 1 cylinder by cylinder, and the intake valves and the exhaust valves are driven for opening or closing by a valve gear that includes a camshaft. Ignition plugs 7 for igniting an air-fuel mixture in the corresponding combustion chambers 3 are installed at the top of the cylinder head cylinder by cylinder.

The intake ports of the respective cylinders are connected to a surge tank 8 via branch pipes 4 corresponding to the cylinders. The surge tank 8 is an intake manifold chamber. An intake pipe 13 is connected to the upstream side of the surge tank 8. An air cleaner 9 is provided at the upstream end of the intake pipe 13. Then, an air flow meter 5 for detecting the intake air flow rate, that is, the intake air volume, and an electrically-controlled throttle valve 10 are assembled to the intake pipe 13 in order from the upstream side. An intake passage is formed of the intake ports, the branch pipes 4, the surge tank 8 and the intake pipe 13.

Injectors (fuel injection valves) 12 that inject fuel into the intake passage, particularly, the corresponding intake ports, are arranged cylinder by cylinder. Fuel injected from each injector 12 is Mixed with intake air to become an air-fuel mixture. The air-fuel mixture is taken into the combustion chamber 3 when the intake valve is open, compressed by the piston and then ignited and burned by the ignition plug 7.

On the other hand, the exhaust ports of the respective cylinders are connected to an exhaust manifold 14. The exhaust manifold 14 is formed of branch pipes 14a and an exhaust manifold portion 14b. The branch pipes 14a for the respective cylinders form the upstream portion of the exhaust manifold 14. The exhaust manifold portion 14b forms the downstream portion of the exhaust manifold 14. An exhaust pipe 6 is connected to the downstream side of the exhaust manifold portion 14b. An exhaust passage is formed of the exhaust ports, the exhaust manifold 14 and the exhaust pipe 6.

Three-way catalysts, that is, an upstream catalyst 11 and a downstream catalyst 19, are serially assembled respectively to the upstream side and downstream side of the exhaust pipe 6. First and second air-fuel ratio sensors, that is, a pre-catalyst sensor 17 and a post-catalyst sensor 18, are respectively provided at the upstream side and downstream side of the upstream catalyst 11 in order to detect the air-fuel ratio of exhaust gas. These pre-catalyst sensor 17 and post-catalyst sensor 18 are respectively provided at positions immediately upstream and downstream of the upstream catalyst 11, and detect the air-fuel ratio on the basis of the oxygen concentration in exhaust gas. In this way, the single pre-catalyst sensor 17 is provided at an exhaust gas collecting portion upstream of the upstream catalyst 11.

An EGR device 22 is provided for the engine 1. The EGR device 22 is used to carry out external EGR (hereinafter, also simply referred to as EGR) by which exhaust gas in the exhaust passage is circulated to the intake passage. The EOR device 22 includes an EGR passage 23, an EGR cooler 24 and an EGR valve 25. The EGR passage 23 connects the exhaust manifold portion 14b of the exhaust manifold 14 to the surge tank 8. The EGR cooler 24 and the EGR valve 25 are provided in the EGR passage 23 in order from the upstream side. The EGR cooler 24 cools exhaust gas, taken out from the exhaust passage, that is, EGR gas. The EGR valve 25 opens or closes to adjust the flow rate of EGR gas that flows through the EGR passage 23.

The above described ignition plugs 7, throttle valve 10, injectors 12 and EGR valve 25 are electrically connected to an electronic control unit (hereinafter, referred to as ECU) 20. The ECU 20 serves as a control unit. The ECU 20 includes a CPU, a ROM, a RAM, input/output ports, a storage device, and the like (all of which are not shown). In addition, as shown in the drawing, in addition to the above described air flow meter 5, pre-catalyst sensor 17 and post-catalyst sensor 18, a crank angle sensor 16, an accelerator operation amount sensor 15 and other various sensors (not shown) are electrically connected to the ECU 20 via an A/D converter (not shown), or the like. The crank angle sensor 16 detects the crank angle of the internal combustion engine 1. The accelerator operation amount sensor 15 detects the accelerator operation amount. The ECU 20 controls the ignition plugs 7, the throttle valve 10, the injectors 12, the EGR valve 25, and the like, on the basis of the values detected by various sensors, or the like, so as to obtain desired output to thereby control the ignition timing, the fuel injection amount, the fuel injection timing, the throttle opening degree, the EGR gas flow rate, and the like.

The ECU 20 detects the crank angle on the basis of a crank pulse signal from the crank angle sensor 16 to determine the cylinder, and calculates or detects the rotation speed of the engine 1. Here, the "rotation speed" means the number of revolutions per unit time. In the present embodiment, the rotation speed means the number of revolutions per minute (rpm).

In addition, the ECU 20 calculates or detects the intake air flow rate, that is, the intake air volume that is the volume of air taken into the engine 1 per unit time, on the basis of a signal from the air flow meter 5. Then, the ECU 20 calculates or detects the load of the engine 1 on the basis of the intake air volume.

Figure 2:
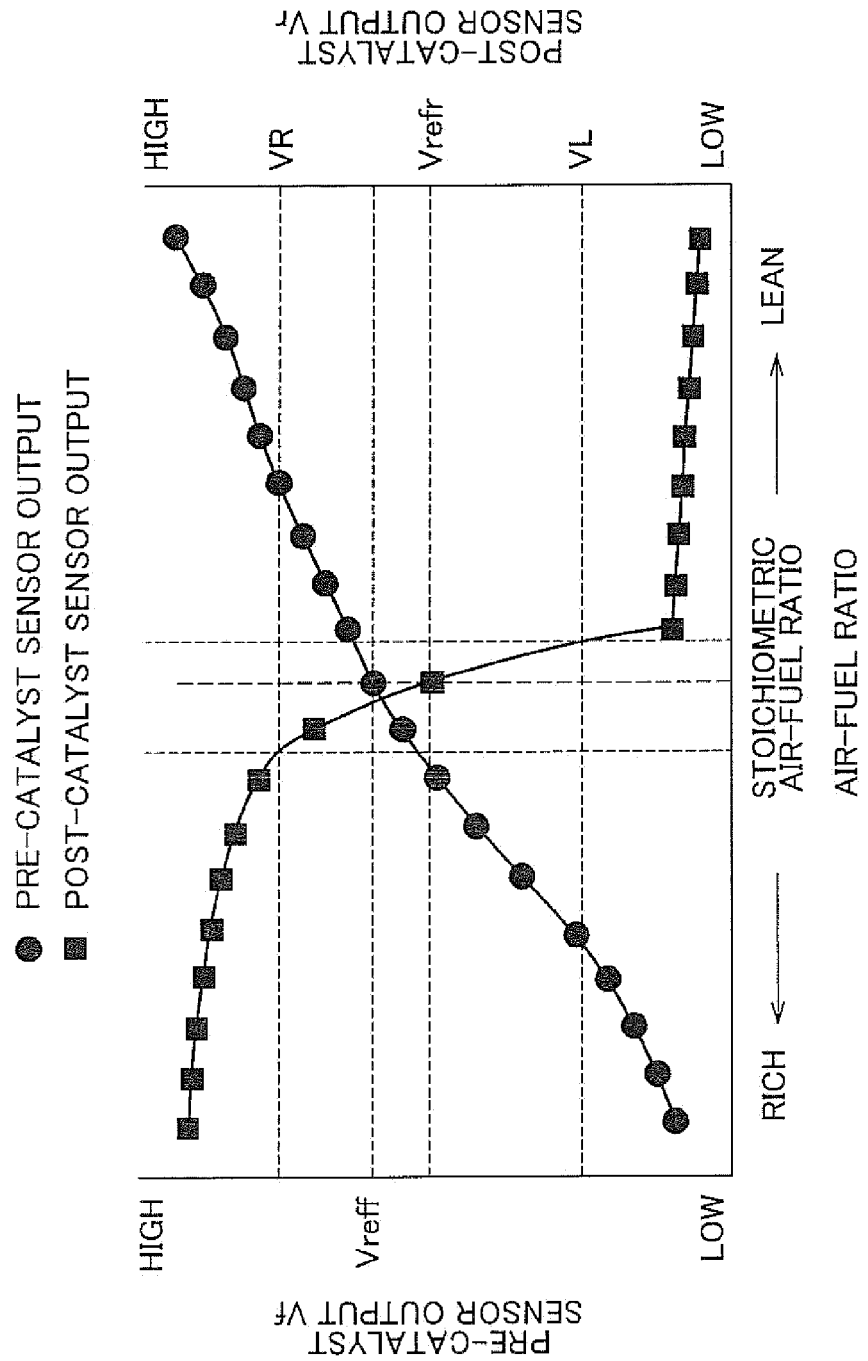
FIG. 2 is a graph that shows the output characteristics of pre-catalyst sensor and post-catalyst sensor that are provided in the embodiment.

The pre-catalyst sensor 17 is formed of a so-called wide-range air-fuel ratio sensor and is able to continuously detect the air-fuel ratio over a relatively wide range. FIG. 2 shows the output characteristics of the pre-catalyst sensor 17. As shown in the graph, the pre-catalyst sensor 17 outputs a voltage signal Vf having a level that is proportional to an exhaust gas air-fuel ratio. When the exhaust gas air-fuel ratio is a stoichiometric air-fuel ratio (for example, A/F=14.5), the output voltage is Vreff (for example, about 3.3 V).

On the other hand, the post-catalyst sensor 18 is formed of a so-called O2 sensor, and has such characteristics that the output value steeply varies at the stoichiometric air-fuel ratio. FIG. 2 shows the output characteristics of the post-catalyst sensor 18. As shown in the drawing, when the exhaust gas air-fuel ratio is the stoichiometric air-fuel ratio, the output voltage, that is, a stoichiometric air-fuel ratio corresponding value, is Vrefr (for example, 0.45 V). The output voltage of the post-catalyst sensor 18 varies within a predetermined range (for example, from 0 to 1 V). When the exhaust gas air-fuel ratio is leaner than the stoichiometric air-fuel ratio, the output voltage of the post-catalyst sensor 18 is lower than the stoichiometric air-fuel ratio corresponding value Vrefr; whereas, when the exhaust gas air-fuel ratio is richer than the stoichiometric air-fuel ratio, the output voltage of the post-catalyst sensor 18 is higher than the stoichiometric air-fuel ratio corresponding value Vrefr.

The upstream catalyst 11 and the downstream catalyst 19 each purify NOx, HC and CO, which are toxic substances in exhaust gas, at the same time when the air-fuel ratio A/F of exhaust gas flowing into the catalyst is near the stoichiometric air-fuel ratio. The range (purification window) of air-fuel ratio, in which these three substances may be purified at the same time with high efficiency, is relatively narrow.

Then, air-fuel ratio control (stoichiometric air-fuel ratio control) is executed by the ECU 20 so that the air-fuel ratio of exhaust gas flowing into the upstream catalyst 11 is brought close to the stoichiometric air-fuel ratio. The air-fuel ratio control is formed of main air-fuel ratio control (main air-fuel ratio feedback control) and auxiliary air-fuel ratio control (auxiliary air-fuel ratio feedback control). In the main air-fuel ratio control, the exhaust gas air-fuel ratio detected by the pre-catalyst sensor 17 is brought into coincidence with the stoichiometric air-fuel ratio that is a predetermined target air-fuel ratio. In the auxiliary air-fuel ratio control, the exhaust gas air-fuel ratio detected by the post-catalyst sensor 18 is brought into coincidence with the stoichiometric air fuel ratio.

Specifically, the ECU 20 calculates a main air-fuel ratio correction amount on the basis of the difference between the exhaust gas air-fuel ratio detected by the pre-catalyst sensor 17 and the stoichiometric air fuel ratio, and calculates an auxiliary air-fuel ratio correction amount on the basis of the difference between the exhaust gas air-fuel ratio detected by the post-catalyst sensor 18 and the stoichiometric air-fuel ratio. Then, the ECU 20 adds or multiplies the main air-fuel ratio correction amount and the auxiliary air-fuel ratio correction amount to or by a basic injection amount determined on the basis of actually detected engine parameters (for example, rotation speed and load) to thereby correct the fuel injection amount such that the respective differences between the detected air-fuel ratios and the stoichiometric air-fuel ratio become zero.

The stoichiometric air-fuel ratio control is uniformly executed over all the cylinders at predetermined processing intervals (for example, one engine cycle=720° CA). That is, the same main air-fuel ratio correction amount and the same auxiliary air-fuel ratio correction amount that are updated at the processing intervals are uniformly used for all the cylinders. However, the rate (frequency) at which the main air-fuel ratio correction amount is updated is higher than the rate (frequency) at which the auxiliary air-fuel ratio correction amount is updated, and, while the main air-fuel ratio correction amount is updated every processing interval, the auxiliary air-fuel ratio correction amount is updated every multiple processing intervals.

Note that the post-catalyst sensor 18 and the auxiliary air-fuel ratio control are not always required in the aspect of the invention but they may be omitted. The pre-catalyst sensor 17 is an example of an air-fuel ratio detecting unit according to the aspect of the invention.

Figure 3:
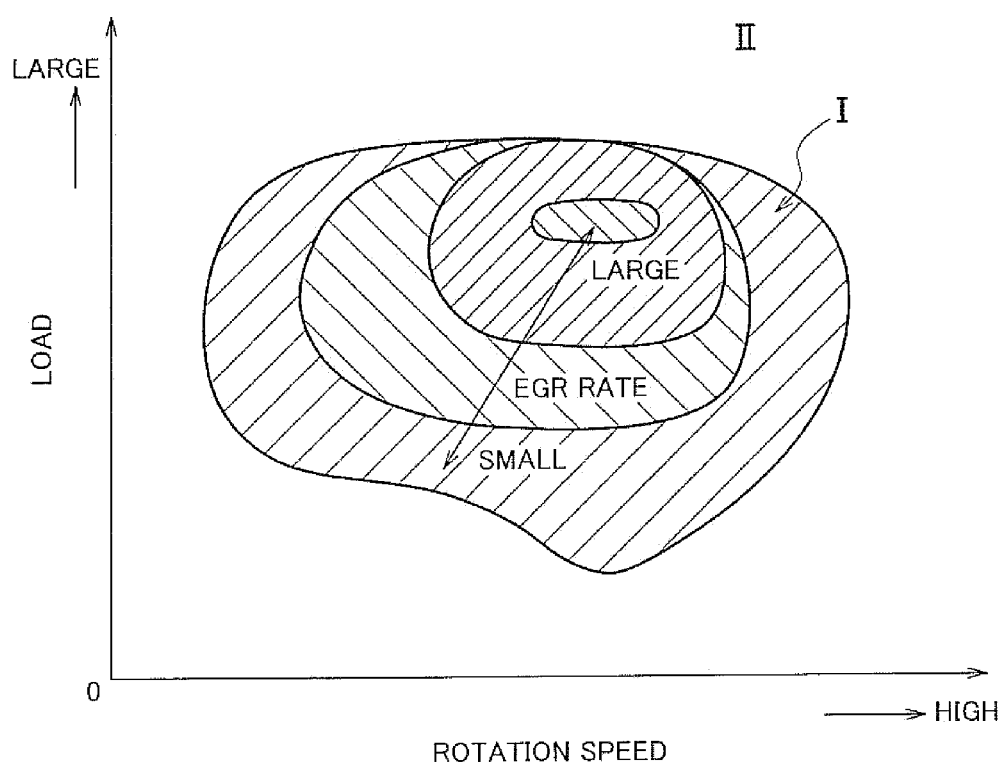
FIG. 3 shows an EGR control map that is used to determine whether to carry out EGR control in the embodiment.

On the other hand, EGR control is carried out by the following method. First, the ECU 20 determines whether to carry out EGR on the basis of the actually detected engine parameters (rotation speed and load) by consulting a map shown in FIG. 3. The hatched area is an EGR region I, and the non-hatched area is a non-EGR region II. When the actual engine parameters fall within the EGR region I, the ECU 20 determines to carry out EGR, and then opens the EGR valve 25. On the other hand, when the actual engine parameters fall within the non-EGR region II, the ECU 20 determines not to carry out EGR, and then fully closes the EGR valve 25.

When it is determined to carry out EGR, the ECU 20 sets the target EGR rate in accordance with the shown map that defines the correlation between engine parameters and a target EGR rate in advance. Then, the opening degree of the EGR valve 25 is controlled such that an actual EGR rate is equal to the set target EGR rate.

Incidentally, as described above, in the multi-cylinder internal combustion engine as in the case of the present embodiment, for example, the fuel injection system (particularly, the injector 12) of at least one of the cylinders (particularly, one cylinder) among all the cylinders fails, the fuel injection amount of the at least one of the cylinders differs from the fuel injection amounts of the other cylinders and, therefore, there may occur an imbalance in air-fuel ratio among the cylinders. This is, for example, the case where injection hole clogging or poor valve opening occurs in the injector 12 of the cylinder #1, the fuel injection amount of the cylinder #1 becomes smaller than those of the other cylinders #2, #3 and #4 and the air-fuel ratio of the cylinder #1 significantly deviates toward a lean air-fuel ratio.

In this case as well, when a relatively large correction amount is given through the above described stoichiometric air-fuel ratio control, the air-fuel ratio of total gas (gas formed of exhaust gases from all the cylinders) supplied to the pre-catalyst sensor 17 (hereinafter, referred to as total air-fuel ratio) may be controlled to the stoichiometric air-fuel ratio. However, observing the air-fuel ratio cylinder by cylinder, the air-fuel ratio of the cylinder #1 is leaner than the stoichiometric air-fuel ratio, the air-fuel ratio of each of the cylinders #2, #3 and #4 is slightly richer than the stoichiometric air-fuel ratio, and then the air-fuel ratio of all the cylinders is the stoichiometric air-fuel ratio in total, so it is apparently undesirable in terms of emissions.

Then, in the present embodiment, the abnormal air-fuel ratio variation among the cylinders, specifically, the abnormal deviation that the air-fuel ratio of at least any one of the cylinders deviates from the stoichiometric air-fuel ratio while stoichiometric air-fuel ratio control is being executed, is detected. A method of detecting the abnormal deviation will be described in detail later.

Figure 4A:
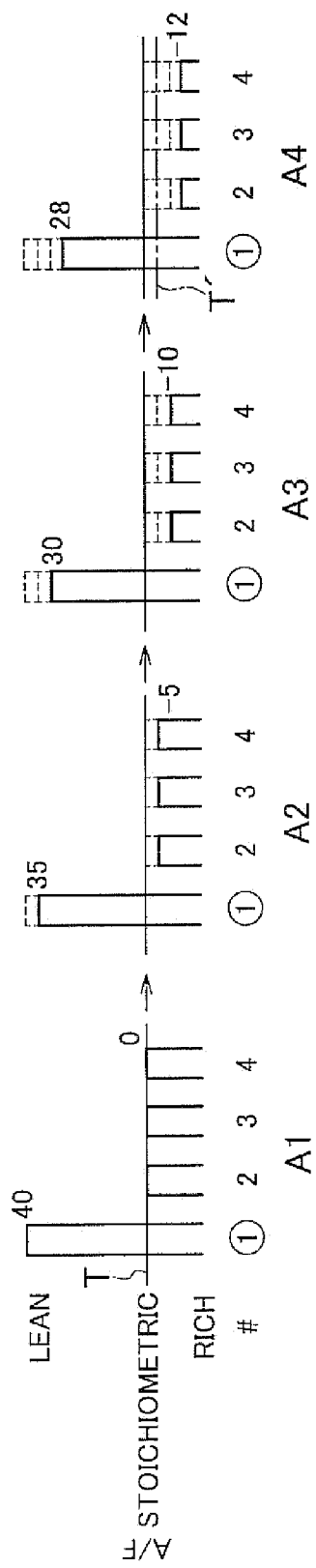
FIG. 4A is a view that shows a correction method when an abnormal lean deviation has occurred in the case where an abnormal cylinder causes more intensive gas flow than the other cylinders in the embodiment.

A1 of FIG. 4A shows an example of the air-fuel ratios A/F of the cylinders at the time when an abnormal deviation has occurred. In this example, the air-fuel ratios of all the cylinders have been the stoichiometric air-fuel ratio as a result of stoichiometric air-fuel ratio control before the abnormal deviation occurs (not shown). However, at the time when the abnormal deviation has occurred, the fuel injection amount of the cylinder #1 is excessively small because of the reason, such as injection hole clogging, and the air-fuel ratio significantly deviates from the stoichiometric air-fuel ratio toward a lean side as shown in the drawing. That is, an abnormal lean deviation is occurring in the cylinder #1. On the other hand, the other Cylinders #2, #3 and #4 are normal, and the air-fuel ratios thereof each remain at the stoichiometric air-fuel ratio.

In this example, the air-fuel ratio of the cylinder #1 deviates from the stoichiometric air-fuel ratio toward a lean side at a deviation rate of 40%. Here, the deviation rate (also referred to as air-fuel ratio deviation rate) means the rate of an air-fuel ratio deviation amount with respect to the stoichiometric air-fuel ratio, and the value of the deviation rate is shown in the drawing. For example, when the stoichiometric air-fuel ratio is 14.5, the air-fuel ratio deviation amount of the cylinder #1 is 14.5×0.4=5.8, and the air-fuel ratio is 14.5×1.4=20.3. On the other hand, in each of the cylinders #2, #3 and #4, the deviation rate is 0%, the air-fuel ratio deviation amount is 0, and the air-fuel ratio is 14.5. The deviation rate is a value that indicates the air-fuel ratio deviation amount.

If the stoichiometric air-fuel ratio control has been executed for a certain period of time in this state, the fuel injection amounts of all the cylinders are uniformly corrected such that the total air-fuel ratio becomes the stoichiometric air-fuel ratio. As a result, as shown in A3 of FIG. 4A, the air-fuel ratios of all the cylinders each are corrected toward a rich side by −10%, and the deviation rate of the cylinder #1 is 30% and the deviation rate of each of the cylinders #2, #3 and #4 is −10%. Here, the deviation rate toward a lean side with respect to the stoichiometric air-fuel ratio is positive and the deviation rate toward a rich side with respect to the stoichiometric air-fuel ratio is negative.

On the other hand, in the present embodiment, in order to compensate for a detection error of the pre-catalyst sensor 17 due to specific components of exhaust gas while EGR is being carried out, the target air-fuel ratio is corrected. This correction is termed EGR correction. The EGR correction is carried out even in a normal state irrespective of whether there is an abnormal deviation.

When EGR is carried out, combustion becomes slow, and relatively large amounts of unburned components, such as H2, CO and HC, are contained in exhaust gas. The air-fuel ratio detected by the pre-catalyst sensor 17 tends to deviate from a true value toward a rich side because of the influence of unburned components (particularly, hydrogen H2). Therefore, when large amounts of unburned components are contained in exhaust gas while EGR is being carried out, the pre-catalyst sensor 17 erroneously recognizes gas, which has an air-fuel ratio leaner than the stoichiometric air-fuel ratio, as gas having the stoichiometric air-fuel ratio, and exhaust gas that arises as a result of main air-fuel ratio control has an air-fuel ratio leaner than the stoichiometric air-fuel ratio. In such a case, the NOx purification rate of the catalyst decreases, and the emissions of NOx increase.

Then, in order to compensate for a detection error due to the influence of unburned components, EGR correction is performed to slightly correct the target air-fuel ratio, which is the control center, toward a rich side. By so doing, gas having the stoichiometric air-fuel ratio is supplied to the catalyst to thereby make it possible to suppress an increase in the emissions of NOx due to a detection error.

In addition, in the present embodiment, flow rate correction is also performed. In the flow rate correction, the target air-fuel ratio is corrected on the basis of an exhaust gas flow rate. That is, when the engine is operated at a high load and the exhaust gas flow rate is relatively high, the purification window of each of the upstream catalyst 11 and the downstream catalyst 19, which are three-way catalysts, slightly shifts toward a rich side.

The reason is as follows. The three-way catalysts that serve as the upstream catalyst 11 and the downstream catalyst 19 each have an oxygen storage/release function of storing oxygen and reducing and removing NOx when the air-fuel ratio of exhaust gas is leaner than the stoichiometric air-fuel ratio and releasing oxygen and oxidizing and removing unburned components when the air-fuel ratio of exhaust gas is richer than the stoichiometric air-fuel ratio. However, when the exhaust gas flow rate is high, the atmosphere in each catalyst becomes slightly lean with respect to the stoichiometric air-fuel ratio even when gas having the stoichiometric air-fuel ratio flows, so the oxygen storage function becomes insufficient, and the emissions of NOx tend to increase. In addition, according to the characteristics of the three-way catalysts, as the air-fuel ratio of exhaust gas deviates toward a lean side with respect to the stoichiometric air-fuel ratio, the NOx purification rate deteriorates extremely. That is, the resistance of each three-way catalyst against NOx is poorer than the resistance thereof against unburned components. Thus, in order to purify NOx and unburned components at the same time with high efficiency, it is necessary to shift the purification window slightly toward a rich side.

Then, in the present embodiment, in synchronization with a shift of the purification window toward a rich side, the target air-fuel ratio is corrected toward a rich side on the basis of an increase in the exhaust gas flow rate. By so doing, the air-fuel ratio of exhaust gas may be constantly adjusted so as to fall within the purification window of each catalyst, so it is possible to suppress an increase in the emissions of NOx due to an increase in the exhaust gas flow rate.

In the present embodiment, the intake air volume is used in place of the exhaust gas flow rate, and the intake air volume is detected by the air flow meter 5 to indirectly detect the exhaust gas flow rate. However, it is also applicable that a flow rate sensor is provided in the exhaust passage to directly detect the exhaust gas flow rate.

Figure 5:
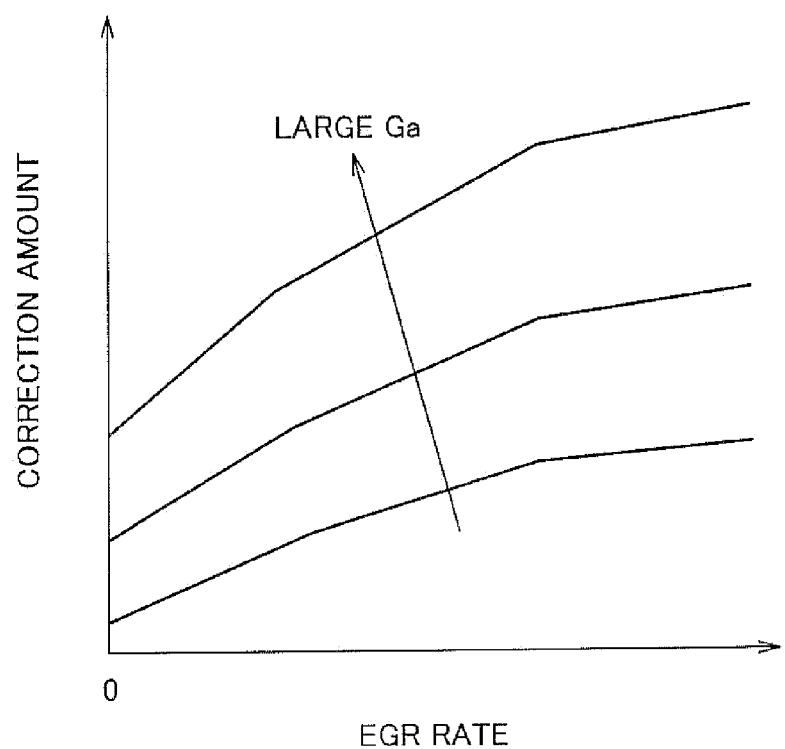
FIG. 5 is a graph that shows the correlation among an EGR rate, an intake air volume and a total correction amount in the embodiment.

A correction amount in the EGR correction and a correction amount in the flow rate correction (respectively referred to as EGR correction amount and flow rate correction amount) will be described with reference to FIG. 5. FIG. 5 shows the correlation among an EGR rate (abscissa axis), an intake air volume Ga and a total correction amount (ordinate axis) of both correction amounts. First, as the EGR rate increases, the EGR correction amount increases, and the target air-fuel ratio is corrected toward a rich side. In addition, as the intake air volume Ga increases, the flow rate correction amount increases, and the target air-fuel ratio is corrected toward a rich side. Thus, as shown in the graph, the total correction amount increases as the EGR rate increases or as the intake air volume Ga increases.

In the present embodiment, correction amount maps that define the correlations among these values are stored in the ECU 20 separately for EGR correction and flow rate correction. Then, the ECU 20 calculates the correction amount corresponding to the target EGR rate and the correction amount corresponding to the intake air volume Ga from the corresponding maps, and, corrects the target air-fuel ratio using these correction amounts.

Note that EGR correction and flow rate correction are not always necessary in the aspect of the invention but they may be omitted. However, it is desirable to perform at least any one of these corrections in terms of improving exhaust gas emissions.

Incidentally, as described above, the stoichiometric air-fuel ratio control is control such that the air-fuel ratio detected by the pre-catalyst sensor 17 becomes the stoichiometric air-fuel ratio. The air-fuel ratio detected by the pre-catalyst sensor 17 tends to deviate from a true value toward a rich side because of the influence of the unburned components. On the other hand, when an abnormal deviation occurs while stoichiometric air-fuel ratio control is being executed and EGR is being carried out, the air-fuel ratio of at least any one of the cylinders is leaner than the stoichiometric air-fuel ratio and contains EGR gas, and large amounts of unburned components are emitted from the at least any one of the cylinders. Because of the influence of the unburned components, the air-fuel ratio detected by the pre-catalyst sensor 17 has a detection error.

Then, in the present embodiment, in order to compensate for the detection error, when an abnormal deviation has been detected, the target air-fuel ratio is corrected. This correction is termed deviation correction. The deviation correction as well as the EGR correction is performed for the purpose of compensating for a detection error due to the influence of unburned components; however, the deviation correction differs from the EGR correction in that the deviation correction is performed only when an abnormal deviation has been detected.

On the other hand, the intensity of exhaust gas that flows against the pre-catalyst sensor 17 (gas flow intensity) is different among the cylinders. Thus, when deviation correction is uniformly performed without taking the difference in gas flow intensity into consideration, the correction may be inappropriate. Here, the gas flow intensity means the flow rate of exhaust gas at the time when exhaust gas flows against the pre-catalyst sensor 17 or the pressure received by the pre-catalyst sensor 17 at the time when exhaust gas flows against the pre-catalyst sensor 17.

Then, in the present embodiment, the mode of deviation correction is changed on the basis of whether the abnormal cylinder causes more intensive gas flow than the other cylinders or causes equal or less intensive gas flow than the other cylinders. Hereinafter, a correction method and its principle at the time when an abnormal deviation has been detected in the present embodiment will be described with reference to FIG. 4A and FIG. 4B. Note that stoichiometric air-fuel ratio control is constantly executed and EGR is constantly carried out here, and EGR correction and flow rate correction are ignored for the sake of convenience. Thus, the target air-fuel ratio T is the stoichiometric air-fuel ratio.

Figure 4B:
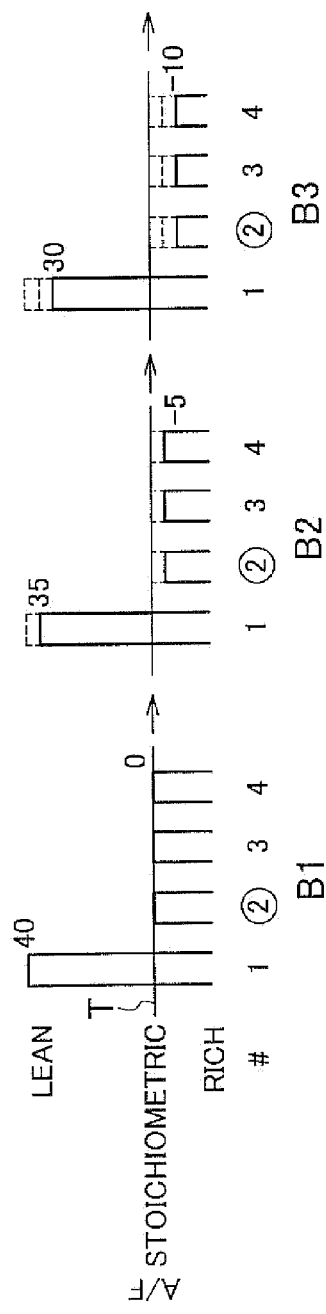
FIG. 4B is a view that shows a correction method when an abnormal lean deviation has occurred in the case where an abnormal cylinder causes equal or less intensive gas flow than the other cylinders in the embodiment.

In FIG. 4A and FIG. 4B, FIG. 4A shows the case where the abnormal cylinder causes more intensive gas flow than the other cylinders, and FIG. 4B shows the case where the abnormal cylinder causes equal or less intensive gas flow than the other cylinders. In the case of FIG. 4A, the air-fuel ratios A/F of the respective cylinders vary in order of A1, A2, A3 and A4. On the other hand, in the case of FIG. 4B, the air-ratios A/F of the respective cylinders vary in order of B1, B2 and B3.

First, in FIG. 4A, A1 shows the air-fuel ratios A/F of the respective cylinders at the time when an abnormal deviation has occurred as described above. In this example, the cylinder #1 causes more intensive gas flow against the pre-catalyst sensor 17 than the other cylinders, and this fact is indicated by the circled number 1. The other cylinders #2, #3 and #4 each cause equal or less intensive gas flow than the other cylinders. An abnormal lean deviation having a deviation rate of 40% is occurring in the cylinder #1 that causes more intensive gas flow than the other cylinders.

At the same time when the abnormal deviation has been detected, fuel injection amount correction is performed in order to bring the total air-fuel ratio of all the cylinders close to the stoichiometric air-fuel ratio, as shown in A2. This correction is termed abnormal-time correction. The abnormal-tithe correction is performed only when an abnormal deviation has been detected and is uniformly performed irrespective of whether the abnormal cylinder causes more intensive gas flow than the other cylinders or equal or less intensive gas flow than the other cylinders. A method for abnormal-time correction will be described in detail later.

In the state of A1, the pre-catalyst sensor 17 recognizes that there is a lean deviation of (deviation rate)/(number of cylinders)=40%/4=10% in total air-fuel ratio. Then, in order to early eliminate the lean deviation as much as possible, the fuel injection amounts of all the cylinders are uniformly corrected so as to be increased. In the illustrated example, the fuel injection amounts are corrected so as to increase by −5% in deviation rate, and, as a result, the deviation rate of the cylinder #1 is 35% and the deviation rate of each of the cylinders #2, #3 and #4 is −5%.

By performing abnormal-time correction, the total air-fuel ratio may be immediately brought close to the stoichiometric air-fuel ratio, and it is possible to suppress deterioration of exhaust gas emissions at the time when an abnormal deviation is occurring. Particularly, the air-fuel ratio of the cylinder #1 that is the abnormal cylinder of which the air-fuel ratio significantly deviates from the stoichiometric air-fuel ratio toward a lean side may be immediately brought close to the stoichiometric air-fuel ratio, so it is possible to immediately reduce the emissions of NOx from the cylinder #1.

As a certain period of time elapses from the state of A2, the fuel injection amounts of all the cylinders are further uniformly corrected so as to increase as a result of the stoichiometric air-fuel ratio control, and the total air-fuel ratio converges to the stoichiometric air-fuel ratio, as shown in A3. Eventually, the air-fuel ratio of the cylinder #1 deviates at the deviation rate of 30%, and the air-fuel ratio of each of the cylinders #2, #3 and #4 deviates at the deviation rate of −10%.

However, in the state of A3, the air-fuel ratio of the cylinder #1 that causes more intensive gas flow than the other cylinders is still much leaner than the stoichiometric air-fuel ratio. In addition, EGR gas is also contained in the cylinder #1. Thus, combustion in the cylinder #1 becomes extremely slow, and relatively large amounts of unburned components are emitted from the cylinder #1. Because the pre-catalyst sensor 17 intensively receives the influence of the unburned components, the air-fuel ratio detected by the pre-catalyst sensor 17 deviates from a true air-fuel ratio toward a rich side. That is, in the state of A3, the pre-catalyst sensor 17 recognizes that the total air-fuel ratio is the stoichiometric air-fuel ratio; however, actually, the total air-fuel ratio is leaner than the stoichiometric air-fuel ratio. There exists a detection error.

If EGR correction is performed simultaneously, only the EGR correction does not bring the total air-fuel ratio rich enough. EGR correction just compensates for a detection error due to EGR, and cannot compensate for a detection error due to an abnormal deviation.

Thus, as shown in A4, deviation correction is performed to correct the target air-fuel ratio T from the stoichiometric air-fuel ratio to a richer value T'. Then, through air-fuel ratio feedback control that uses T' as the target air-fuel ratio, the fuel injection amounts of all the cylinders are uniformly corrected so as to increase. In the illustrated example, the target air-fuel ratio is corrected at the deviation rate of −2% and the fuel injection amounts are corrected so as to increase, and, as a result, the deviation rate of the cylinder #1 is 28% and the deviation rate of each of the cylinders #2, #3 and #4 is −12%.

In this case, the total air-fuel ratio is richer than the stoichiometric air-fuel ratio according to the values detected by the pre-catalyst sensor 17; however, the total air-fuel ratio is actually the stoichiometric air-fuel ratio. In this way, the air-fuel ratio of actual exhaust gas is controlled to the stoichiometric air-fuel ratio to improve the accuracy of air-fuel ratio control, and it is possible to suppress deterioration of exhaust gas emissions at the time when an abnormal deviation is occurring.

Next, FIG. 4B will be described. B1 as well as A1 shows the air-fuel ratios A/F of the cylinders at the time when an abnormal deviation has occurred. In this example, the cylinder #2 causes more intensive gas flow than the other cylinders, and this fact is indicated by the circled number 2. The other cylinders #1, #3 and #4 each cause equal or less intensive gas flow than the other cylinders. An abnormal lean deviation having a deviation rate of 40% is occurring in the cylinder #1 that causes equal or less intensive gas flow than the other cylinders.

At the same time when the abnormal deviation has been detected, abnormal-time correction is performed, as shown in B2. This point is similar to the case of FIG. 4A. As a result of abnormal-time correction, the deviation rate of the cylinder #1 is 35% and the deviation rate of each of the cylinders #2, #3 and #4 is −5%.

As a certain period of time elapses from the state of B2, the fuel injection amounts of all the cylinders are further uniformly corrected so as to increase as a result of stoichiometric air-fuel ratio control, and the total air-fuel ratio becomes the stoichiometric air-fuel ratio, as shown in B3. Eventually, the air-fuel ratio of the cylinder #1 deviates at the deviation rate of 30%, and the air-fuel ratio of each of the cylinders #2, #3 and #4 deviates at the deviation rate of −10%.

In the state of B3, the air-fuel ratio of the cylinder #1 that causes equal or less intensive gas flow than the other cylinders is much leaner than the stoichiometric air-fuel ratio, so, even when relatively large amounts of unburned components are emitted from the cylinder #1, the pre-catalyst sensor 17 does not receive the influence so much. Rather, the pre-catalyst sensor 17 intensively receives the influence from exhaust gas from the cylinder #2 of which the air-fuel ratio is slightly richer than the stoichiometric air-fuel ratio. EGR gas is also contained in the cylinder #2; however, the air-fuel ratio is rich, so combustion does not become so slow and unburned components are not emitted so much. Thus, the total air-fuel ratio that the pre-catalyst sensor 17 recognizes as the stoichiometric air-fuel ratio may also be regarded as the stoichiometric air-fuel ratio actually, and a detection error is not so large.

If EGR correction is performed simultaneously, the EGR correction brings the total air-fuel ratio rich enough. Then, in this case, deviation correction is not performed. By so doing as well, the actual total air-fuel ratio is controlled to the stoichiometric air-fuel ratio to thereby make it possible to suppress deterioration of exhaust gas emissions at the time when an abnormal deviation is occurring.

In this way, the Mode of deviation correction is changed on the basis of whether the abnormal cylinder causes more intensive gas flow than the other cylinders or causes equal or less intensive gas flow than the other cylinders, so, when an abnormal deviation occurs while air-fuel ratio feedback control is being executed and external EGR is being carried out, appropriate correction may be performed.

Note that, in the examples described here, deviation correction is performed when the abnormal cylinder causes more intensive gas flow than the other cylinders, and deviation correction is not performed when the abnormal cylinder causes equal or less intensive gas flow than the other cylinders. However, another method is also possible. For example, it is applicable that deviation correction is performed using a relatively large correction amount when the abnormal cylinder causes more intensive gas flow than the other cylinders and deviation correction is performed using a relatively small correction amount when the abnormal cylinder causes equal or less intensive gas flow than the other cylinders.

For example, referring to the examples shown in FIG. 4A and FIG. 4B, when the abnormal cylinder is the cylinder #1 that causes more intensive gas flow than the other cylinders as shown in FIG. 4A, rich correction at the deviation rate of −2% is performed in the state of A3. In contrast to this, when the abnormal cylinder is the cylinder #1 that causes equal or less intensive gas flow than the other cylinders as shown in FIG. 4B, rich correction at the deviation rate of −1% may be performed in the state of B3.

Next, a correction method and its principle at the time when an abnormal rich deviation, which is opposite to the abnormal lean deviation, has been detected will be described with reference to FIG. 6A and FIG. 6B. As well as FIG. 4A and FIG. 4B, FIG. GA shows the case where the abnormal cylinder is the cylinder #1 that causes more intensive gas flow than the other cylinders, and FIG. 6B shows the case where the abnormal cylinder is the cylinder #1 that causes equal or less intensive gas flow than the other cylinders.

First, in FIG. 6A, as shown in A1, at the time when an abnormal deviation has occurred, an abnormal rich deviation having a deviation rate of −40% is occurring in the cylinder #1 that causes more intensive gas flow than the other cylinders.

At the same time when the abnormal deviation has been detected, abnormal-time correction is performed as shown in A2 to perform correction so as to uniformly reduce the air-fuel ratios of all the cylinders by 5%. As a result, the deviation rate of the cylinder #1 is −35%, and the deviation rate of each of the cylinders #2, #3 and #4 is 5%.

As a certain period of time elapses from the state of A2, the fuel injection amounts of all the cylinders are further uniformly corrected so as to reduce as a result of the stoichiometric air-fuel ratio control, and the total air-fuel ratio becomes the stoichiometric air-fuel ratio, as shown in A3. Eventually, the air-fuel ratio of the cylinder #1 deviates at the deviation rate of −30%, and the air-fuel ratio of each of the cylinders #2, #3 and #4 deviates at the deviation rate of 10%.

In the state of A3, the air-fuel ratio of the cylinder #1 that causes more intensive gas flow than the other cylinders is much richer than the stoichiometric air-fuel ratio. Thus, EGR gas is also contained in the cylinder #1; however, unburned components are not emitted from the cylinder #1 so much. On the other hand, the air-fuel ratio of each of the cylinders #2, #3 and #4, each of which causes equal or less intensive gas flow than the other cylinders, is slightly leaner than the stoichiometric air-fuel ratio; however, unburned components emitted from these cylinders do not influence the pre-catalyst sensor 17 so much. Thus, a detection error due to the influence of unburned components of the pre-catalyst sensor 17 is not so large. If EGR correction is performed simultaneously, the EGR correction brings the total air-fuel ratio rich enough.

Thus, as in the case of B3 of FIG. 43 deviation correction is not performed in this case. By so doing, the actual total air-fuel ratio is controlled to the stoichiometric air-fuel ratio to thereby make it possible to suppress deterioration of exhaust gas emissions at the time when an abnormal deviation is occurring.

Next, FIG. 6B will be described. As shown in B1, an abnormal rich deviation having a deviation rate of −40% is occurring in the cylinder #1 that causes equal or less intensive gas flow than the other cylinders.

At the same time when the abnormal deviation has been detected, abnormal-time correction is performed so as to uniformly reduce the air-fuel ratios of all the cylinders, and, as a result, the deviation rate of the cylinder #1 is −35%, and the deviation rate of each of the cylinders #2, #3 and #4 is 5%, as shown in B2.

As a certain period of time elapses from the state of B2, as a result of stoichiometric air-fuel ratio control, the fuel injection amounts of all the cylinders are further uniformly corrected so as to reduce, and the total air-fuel ratio becomes the stoichiometric air-fuel ratio, as shown in B3. Eventually, the air-fuel ratio of the cylinder #1 deviates at the deviation rate of −30%, and the air-fuel ratio of each of the cylinders #2, #3 and #4 deviates at the deviation rate of 10%.

In the state of B3, the air-fuel ratio of the cylinder #2 that causes more intensive gas flow than the other cylinders is leaner than the stoichiometric air-fuel ratio; however. EGR gas is also contained in the cylinder #2. Thus, combustion in the cylinder #2 becomes slow, and relatively large amounts of unburned components are emitted from the cylinder #2. Because the pre-catalyst sensor 17 intensively receives the influence of the unburned components, the air-fuel ratio detected by the pre-catalyst sensor 17 deviates from a true air-fuel ratio toward a rich side. The pre-catalyst sensor 17 recognizes that the total air-fuel ratio is the stoichiometric air-fuel ratio; however, actually, the total air-fuel ratio is leaner than the stoichiometric air-fuel ratio. There exists a detection error. If EGR correction is performed simultaneously, only the EGR correction does not bring the total air-fuel ratio rich enough.

Then, as shown in B4, deviation correction is performed to correct the target air-fuel ratio T from the stoichiometric air-fuel ratio to a richer value T'. Then, through air-fuel ratio feedback control that uses T as the target air-fuel ratio, the fuel injection amounts of all the cylinders are uniformly corrected so as to increase. In the illustrated example, the target air-fuel ratio is corrected at the deviation rate of −2% and the fuel injection amounts are corrected so as to increase, and, as a result, the deviation rate of the cylinder #1 is −32%, and the deviation rate of each of the cylinders #2, #3 and #4 is 8%.

In this way, the air-fuel ratio of actual exhaust gas is controlled to the stoichiometric air-fuel ratio to improve the accuracy of air-fuel ratio control, and it is possible to suppress deterioration of exhaust gas emissions at the time when an abnormal deviation is occurring.

Next, a correction routine in the present embodiment will be described with reference to FIG. 7A and FIG. 7B. The routine shown as the flow chart is repeatedly executed at predetermined processing intervals (here, one engine cycle) by the ECU 20. Note that, while the correction routine is being executed, stoichiometric air-fuel ratio control is constantly executed by another routine (not shown).

First, in step S101, a flow rate correction amount T1 is calculated. At this time, as described above, the ECU 20 calculates the flow rate correction amount T1 corresponding to the intake air volume Ga detected by the air flow meter 5 from a predetermined map. As the intake air volume Ga increases, the flow rate correction amount T1 increases (see FIG. 5).

Subsequently, in step S 102, it is determined whether EGR is being carried out. At this time, the ECU 20 determines that EGR is being carried out when the detected engine parameters (rotation speed and load) fall within the EGR region I of the map shown in FIG. 3, and determines that EGR is not being carried out when the engine parameters fall outside the EGR region I of the map (fall within the non-EGR region II).

When it is determined that EGR is being carried out, the process proceeds to step S103; whereas, when it is determined that EGR is not being carried out, the process proceeds to step S112.

In step S103, an EGR correction amount T2 is calculated. At this time, as described above, the ECU 20 calculates the target EGR rate corresponding to the detected engine parameters from the map shown in FIG. 3, and calculates the EGR correction amount T2 corresponding to the target EGR rate from a predetermined map. As the target EGR rate increases, the EGR correction amount T2 increases (see FIG. 5).

Subsequently, in step S104, it is determined whether an abnormal variation or an abnormal air-fuel ratio deviation has been detected. The detection and determination are performed by the following method.

In the present embodiment, the air-fuel ratios of the respective cylinders are individually detected on the basis of the output of the pre-catalyst sensor 17. Exhaust gas emitted from each of the cylinders sequentially contacts with the pre-catalyst sensor 17 with a time delay, and, in response to this, the air-fuel ratio detected by the pre-catalyst sensor 17 also varies to a value corresponding to the air-fuel ratio of exhaust gas in each of the cylinders.

Figure 8:
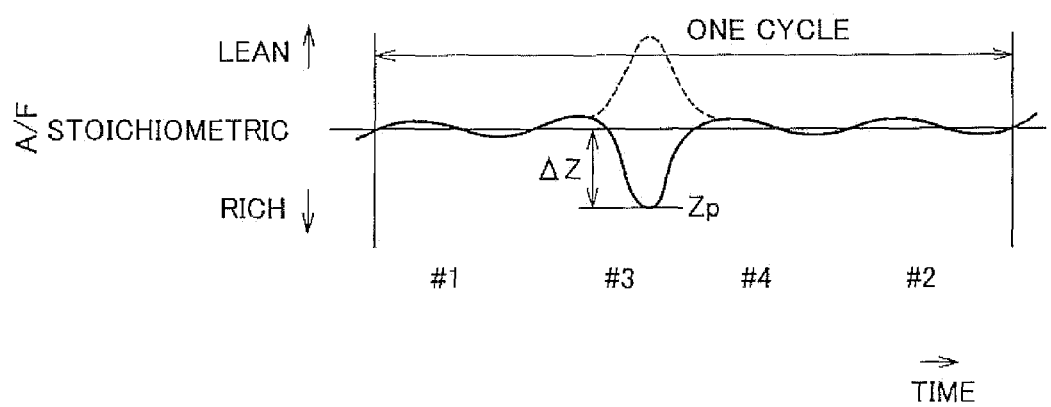
FIG. 8 is a time chart that shows a variation in air-fuel ratio detected by the pre-catalyst sensor in the embodiment.

FIG. 8 shows such a variation in the air-fuel ratio A/F detected by the pre-catalyst sensor 17. The ECU 20 constantly acquires which cylinder exhaust gas corresponding to the detected air-fuel ratio comes from on the basis of its cylinder determination function, the intake air volume Ga, and the like. Then, when there is a detected air-fuel ratio that significantly deviates (that is, by a predetermined value or above) from the stoichiometric air-fuel ratio within one engine cycle, the ECU 20 determines that an abnormal air-fuel ratio deviation has occurred in the cylinder corresponding to the detected air-fuel ratio. By so doing, the ECU 20 detects occurrence of an abnormal air-fuel ratio deviation. On the other hand, when there is no detected air-fuel ratio that significantly deviates from the stoichiometric air-fuel ratio, the ECU 20 determines that no abnormal air-fuel ratio deviation has occurred.

The ECU 20 calculates an air-fuel ratio difference $\Delta Z$ that is obtained by subtracting the stoichiometric air-fuel ratio (14.5) from the detected air-fuel ratio Z, and, when the absolute value of the air-fuel ratio difference $\Delta Z$ is larger than or equal to a predetermined value (for example, 4.35) corresponding to a predetermined deviation rate (for example, 30%), determines that an abnormal air-fuel ratio deviation has occurred. In FIG. 8, the solid line indicates an example of the case where an abnormal rich deviation has occurred in the cylinder #3, and the broken line indicates an example of the case where an abnormal lean deviation has occurred in the cylinder #3.

Figure 7A:
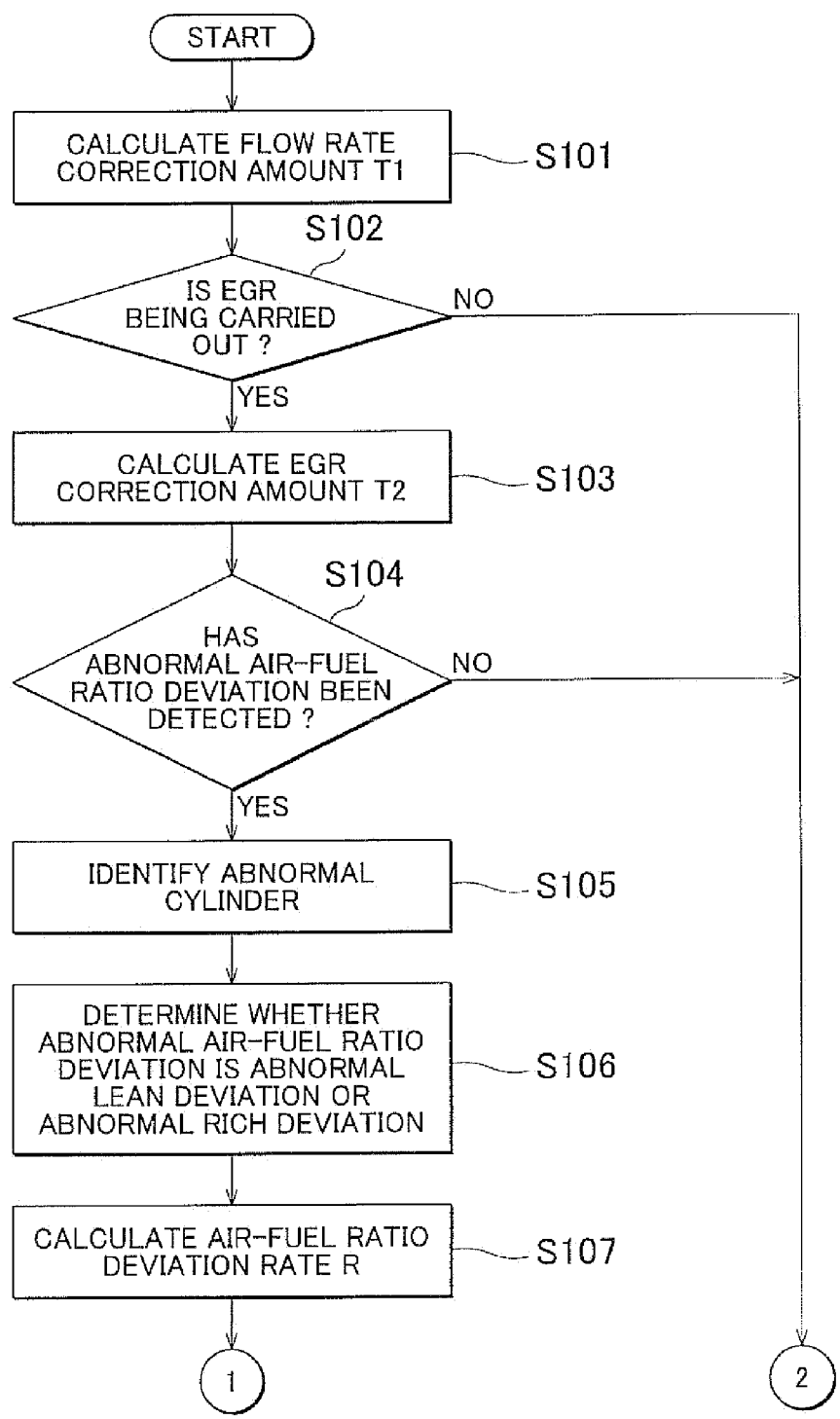
FIG. 7A and FIG. 7B are flow charts of a correction routine for correcting a fuel injection amount in the embodiment.
Figure 7B:
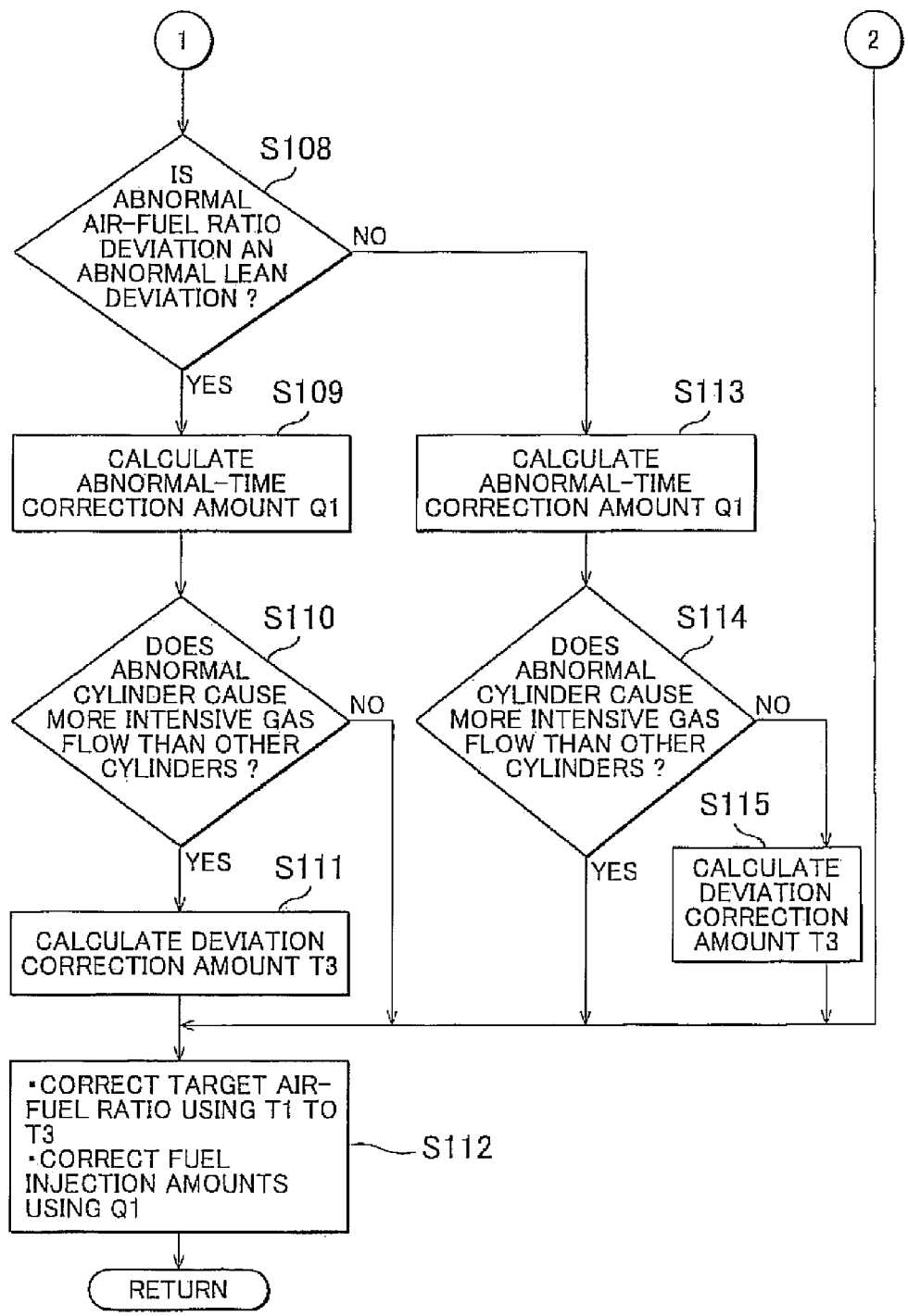

As shown in FIG. 7A and FIG. 7B, when an abnormal air-fuel ratio deviation has been detected, the process proceeds to step S105; whereas, when no abnormal air-fuel ratio deviation has been detected, the process proceeds to step S112.

In step S105, the abnormal cylinder is detected or identified. That is, the ECU 20 identifies the cylinder, corresponding to the detected air-fuel ratio Z that gives the absolute value of the air-fuel ratio difference AZ larger than or equal to the predetermined value, as the abnormal cylinder.

Subsequently, in step S106, it is determined whether the abnormal air-fuel ratio deviation is an abnormal lean deviation or an abnormal rich deviation. That is, the ECU 20 determines that the abnormal air-fuel ratio deviation is an abnormal lean deviation when the detected air-fuel ratio Z that gives the absolute value of the air-fuel ratio difference $\Delta Z$ larger than or equal to the predetermined value is larger than the stoichiometric air-fuel ratio, and determines that the abnormal air-fuel ratio deviation is an abnormal rich deviation when the detected air-fuel ratio Z is smaller than the stoichiometric air-fuel ratio. In this way, an abnormal lean deviation and an abnormal rich deviation are detected as distinguished from each other.

Subsequently, in step S107, an air-fuel ratio deviation rate R is calculated. That is, the ECU 20 acquires a local maximum or local minimum peak value Zp (see FIG. 8) of the detected air-fuel ratio Z that gives the absolute value of the air-fuel ratio difference $\Delta Z$ larger than or equal to the predetermined value, and uses the mathematical expression R (4−14.5)/14.5 to calculate the air-fuel ratio deviation rate R. The air-fuel ratio deviation rate R corresponds to the air-fuel ratio deviation amount of the abnormal cylinder.

Note that detecting the abnormal air-fuel ratio deviation, identifying the abnormal cylinder, determining the abnormal lean/rich deviation and calculating the air-fuel ratio deviation rate in steps S105 to S107 may be performed by other methods including known methods. For example, the above operations may be performed by utilizing an increase in rotation fluctuations due to an abnormal air-fuel ratio deviation, a variation in auxiliary air-fuel ratio control learning value, or the like.

Subsequently, in step S108, it is determined whether the abnormal air-fuel ratio deviation is an abnormal lean deviation. When it is determined that the abnormal air-fuel ratio deviation is an abnormal lean deviation, the process proceeds to Step S109; whereas, when it is determined that the abnormal air-fuel ratio deviation is not an abnormal lean deviation (the abnormal air-fuel ratio deviation is an abnormal rich deviation), the process proceeds to step S113.

In step S109, an abnormal-time correction amount Q1 is calculated. At this time, the ECU 20 calculates the abnormal-time correction amount Q1 corresponding to the air-fuel ratio deviation rate R from a predetermined map.

As the air-fuel ratio deviation rate R increases in the positive direction, that is, the lean direction, the calculated abnormal-time correction amount Q1 increases in the positive direction, that is, the increasing direction. By so doing, appropriate abnormal-time correction based on the air-fuel ratio deviation amount of the abnormal cylinder may be performed.

Note that an abnormal-time correction amount Q1 having a set value may be calculated irrespective of the air-fuel ratio deviation amount. In this case, when the air-fuel ratio deviation rate R is positive, the set positive abnormal-time correction amount Q1 is calculated.

Alternatively, an abnormal-time correction amount Q1 that brings the total air-fuel ratio to the stoichiometric air-fuel ratio at a stroke may be calculated on the basis of the air-fuel ratio deviation rate R. For example, referring to the example of FIG. 4A, the air-fuel ratio deviation rate R of the abnormal cylinder is 40% in A1, so a value that is obtained by dividing the air-fuel ratio deviation rate R by the number of cylinders, which is 4, that is, an abnormal-time correction amount Q1 corresponding to −10%, which compensates for a 10% lean deviation of the total air-fuel ratio, may be calculated. This can directly vary from the state of A1 to the state of A3, and it is possible to immediately suppress deterioration of exhaust gas emissions at the time when an abnormal deviation is occurring.

Subsequently, in step S110, it is determined whether the abnormal cylinder identified in step S105 causes more intensive gas flow than the other cylinders. That is, the ECU 20 prestores cylinder information about gas flow intensity, and makes the above determination on the basis of the cylinder information.

When it is determined that the abnormal cylinder causes more intensive gas flow than the other cylinders, the process proceeds to step S111; whereas, when it is determined that the abnormal cylinder does not cause more intensive gas flow than the other cylinders (the abnormal cylinder causes equal or less intensive gas flow than the other cylinders), the process skips step S111 and proceeds to step S112.

In step S111, a deviation correction amount T3 is calculated. At this time, the ECU 20 calculates a deviation correction amount T3 corresponding to the air-fuel ratio deviation rate R calculated in step S107 from a predetermined map.

As the air-fuel ratio deviation rate R increases in the positive direction, that is, the lean direction, the calculated deviation correction amount T3 increases in the positive direction, that is, the rich direction. In this way, the deviation correction amount is changed on the basis of the air-fuel ratio deviation amount.

This is because, as the absolute value of the air-fuel ratio deviation rate R increases (that is, as the air-fuel ratio deviation amount increases), the lean degree of the lean cylinder that causes more intensive gas flow than the other cylinders (the cylinder #1 in A3 of FIG. 4A and the cylinder #2 in B3 of FIG. 6B) increases, and a detection error due to the influence of unburned components increases. On the other hand, by so doing, appropriate deviation correction based on the influence of unburned components and the magnitude of a detection error may be performed.

Note that a deviation correction amount T3 having a set value may be calculated irrespective of the air-fuel ratio deviation amount. In this case, the set positive deviation correction amount T3 is calculated irrespective of the air-fuel ratio deviation rate R.

After that, in step S112, the target air-fuel ratio is corrected on the basis of the flow rate correction amount T1, the EGR correction amount T2 and the deviation correction amount T3. In this case, the positive correction amounts T1 to T3 are subtracted from the stoichiometric air-fuel ratio (14.5), which is a reference target air-fuel ratio, to calculate a richer corrected target air-fuel ratio.

In addition, in step S112, the fuel injection amounts are corrected on the basis of the abnormal-time correction amount Q1. In this case, the positive abnormal-time correction amount Q1 is added to calculate fuel injection amounts that are corrected so as to increase. Note that the abnormal-time correction is performed only once at the time when an abnormal deviation has been detected. Thus, the routine ends.

Here, there is a case where any one of the correction amounts T1 to T3 and Q1 is not calculated. For example, when it is determined in step S110 that the abnormal cylinder causes equal or less intensive gas flow than the other cylinders, the deviation correction amount T3 is not calculated. In this case, the uncalculated correction amount is set at zero. By so doing, correction corresponding to the uncalculated correction amount is not substantially performed.

Deviation correction is performed at the same time when an abnormal air-fuel ratio deviation has been detected in advance of the time when the total air-fuel ratio becomes the stoichiometric air-fuel ratio through stoichiometric air-fuel ratio control. For example, referring to the example of FIG. 4A, at the same time when the abnormal deviation shown in A1 has been detected, abnormal-time correction shown in A2 and deviation correction shown in A4 are performed. Thus, at the time when the total air-fuel ratio converges to the stoichiometric air-fuel ratio through stoichiometric air-fuel ratio control, a detection error due to the influence of unburned components has been already compensated.

Subsequently, when it is determined in step SI 08 that the abnormal air-fuel ratio deviation is an abnormal rich deviation, an abnormal-time correction amount Q1 is calculated in step S113. At this time as well, the ECU 20 calculates the abnormal-time correction amount Q1 corresponding to the air-fuel ratio deviation rate R calculated in step S107 from the predetermined map.

As the air-fuel ratio deviation rate R increases in the negative direction, that is, the rich direction, the calculated abnormal-time correction amount Q1 increases in the negative direction, that is, the reducing direction. By so doing, appropriate abnormal-time correction based on the air-fuel ratio deviation amount may be performed.

Note that an abnormal-time correction amount Q1 having a set value may be calculated irrespective of the air-fuel ratio deviation amount. In this case, when the air-fuel ratio deviation rate R is negative, the set negative abnormal-time correction amount Q1 is calculated.

Subsequently, in step S114, it is determined whether the abnormal cylinder identified in step S105 causes more intensive gas flow than the other cylinders. This determination method is the same as that of step S110.

When it is determined that the abnormal cylinder causes more intensive gas flow than the other cylinders, the process skips step S115 and proceeds to step S112; whereas, when it is determined that the abnormal cylinder does not cause more intensive gas flow than the other cylinders (the abnormal cylinder causes equal or less intensive gas flow than the other cylinders), the process proceeds to step S115.

In step S115, a deviation correction amount T3 is calculated. At this time, the ECU 20 calculates a deviation correction amount T3 corresponding to the air-fuel ratio deviation rate R calculated in step S107 from the predetermined map.

As the air-fuel ratio deviation rate R increases in the negative direction, that is, the rich direction, the calculated deviation correction amount T3 increases in the positive direction, that is, the rich direction. That is, even when the air-fuel ratio deviation rate R is large in the lean direction or large in the rich direction, the calculated deviation correction amount T3 constantly increases in the positive direction, that is, the rich direction. Thus, the fuel injection amounts are also constantly corrected so as to increase.

Note that a deviation correction amount T3 having a set value may be calculated irrespective of the air-fuel ratio deviation amount. In this case, the set positive deviation correction amount T3 is calculated irrespective of the air-fuel ratio deviation rate R.

In this way, when an abnormal lean deviation has been detected, deviation correction is performed when the abnormal cylinder causes more intensive gas flow than the other cylinders, and no deviation correction is performed when the abnormal cylinder causes equal or less intensive gas flow than the other cylinders. In addition, when an abnormal rich deviation has been detected, no deviation correction is performed when the abnormal cylinder causes more intensive gas flow than the other cylinders, and deviation correction is performed when the abnormal cylinder causes equal or less intensive gas flow than the other cylinders.

By so doing, deviation correction may be performed only in the case where a detection error due to the influence of unburned components can be problematic, so it is possible to provide further proper deviation correction.

The embodiment of the invention is described in detail above; however, there are various other embodiments of the invention. For example, the numeric values described above are only illustrative and may be changed to other numeric values. An embodiment in which at least one of step S101 associated with flow rate correction, step S103 associated with EGR correction and steps S109 and S113 associated with abnormal-time correction is omitted is possible. The internal combustion engine may be, for example, of a direct-.injection type or a dual-injection type.

The aspect of the invention is not limited to the above described embodiments. The aspect of the invention encompasses all alternative examples and application examples included in the idea of the invention defined by the appended claims and equivalents thereof. Thus, the aspect of the invention should not be interpreted restrictively. The aspect of the invention may also be applied to any other techniques that belong to the scope of the idea of the invention.

While the invention has been described with reference to example embodiments thereof, it is to be understood that the invention is not limited to the described example embodiments or constructions. To the contrary, the invention is intended to cover various modifications and equivalent arrangements. In addition, while the various elements of the example embodiments are shown in various combinations and configurations, other combinations and configurations, including more, less or only single element, are also within the scope of the invention.

What is claimed is:

1. A control device for a multi-cylinder internal combustion engine, comprising:

an air-fuel ratio detecting unit that is provided in an exhaust passage of the multi-cylinder internal combustion engine;

an air-fuel ratio control unit that is configured to execute air-fuel ratio feedback control such that an air-fuel ratio of exhaust gas, detected by the air-fuel ratio detecting unit, becomes a predetermined target air-fuel ratio;

an EGR device that is configured to carry out external EGR by which exhaust gas in the exhaust passage is circulated to an intake passage of the multi-cylinder internal combustion engine;

an abnormality detecting unit that is configured to, when an abnormal deviation that an air-fuel ratio of at least any one of cylinders deviates from the target air-fuel ratio while the air-fuel ratio control unit is executing the air-fuel ratio feedback control has occurred, detect the abnormal deviation and an abnormal cylinder that is the at least any one of the cylinders; and a deviation correction unit that is configured to, when the abnormal deviation has been detected while the air-fuel ratio control unit is executing the air-fuel ratio feedback control and the EGR device is carrying out the external EGR, correct the target air-fuel ratio in order to compensate for a detection error of the air-fuel ratio detecting unit due to an influence of specific components of exhaust gas and that is configured to change a mode of correction on the basis of whether the detected abnormal cylinder causes more intensive gas flow against the air-fuel ratio detecting unit than the other cylinders or causes equal or less intensive gas flow against the air-fuel ratio detecting unit than the other cylinders, wherein the abnormality detecting unit is configured to detect an abnormal lean deviation that the air-fuel ratio of the abnormal cylinder deviates from the target air-fuel ratio toward a lean side and an abnormal rich deviation that the air-fuel ratio of the abnormal cylinder deviates from the target air-fuel ratio toward a rich side as distinguished from each other, when the abnormal lean deviation has been detected, the deviation correction unit is configured to correct the target air-fuel ratio when the abnormal cylinder causes more intensive gas flow than the other cylinders and not to correct the target air-fuel ratio when the abnormal cylinder causes equal or less intensive gas flow than the other cylinders; whereas, when the abnormal rich deviation has been detected, the deviation correction unit is configured not to correct the target air-fuel ratio when the abnormal cylinder causes more intensive gas flow than the other cylinders and to correct the target air-fuel ratio when the abnormal cylinder causes equal or less intensive gas flow than the other cylinders.

2. The control device according to claim 1, wherein when the deviation correction unit corrects the target air-fuel ratio, the deviation correction unit is configured to correct the target air-fuel ratio toward the rich side.

3. The control device according to claim 1, wherein the abnormality detecting unit is configured to further detect an air-fuel ratio deviation amount of the abnormal cylinder at the time when the abnormal deviation is occurring, and when the deviation correction unit corrects the target air-fuel ratio, the deviation correction unit is configured to change a correction amount on the basis of the detected air-fuel ratio deviation amount.

4. The control device according to claim 1, further comprising:

an abnormal-time correction unit that is configured to, when the abnormal deviation has been detected by the abnormality detecting unit, correct a fuel injection amount in order to bring a total air-fuel ratio of all the cylinders close to a stoichiometric air-fuel ratio.

5. The control device according to claim 1, further comprising:

an EGR rate calculation unit that is configured to calculate an EGR rate of the external EGR; and an EGR correction unit that is configured to correct the target air-fuel ratio on the basis of the calculated EGR rate.

6. The control device according to claim 1, further comprising:

a flow rate detecting unit that is configured to detect an exhaust gas flow rate; and a flow rate correction unit that is configured to correct the target air-fuel ratio on the basis of the detected exhaust gas flow rate.

* * * * *